May 18, 1954  R. T. ERBAN  2,678,580
IMAGE INVERTING APPARATUS
Filed March 20, 1950  5 Sheets-Sheet 1
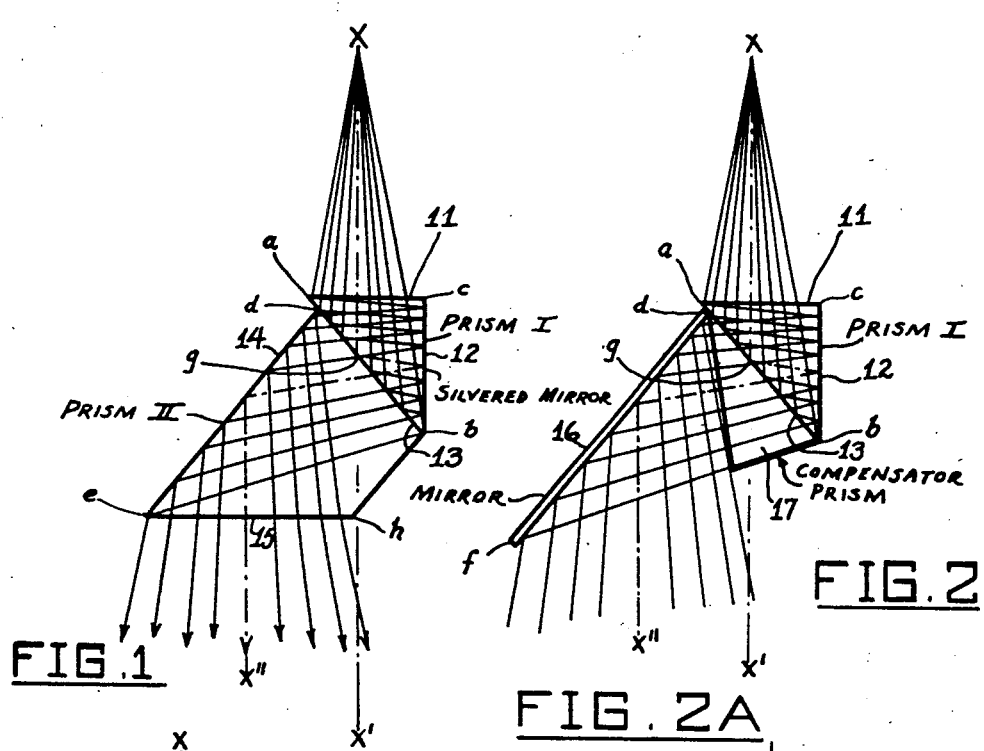
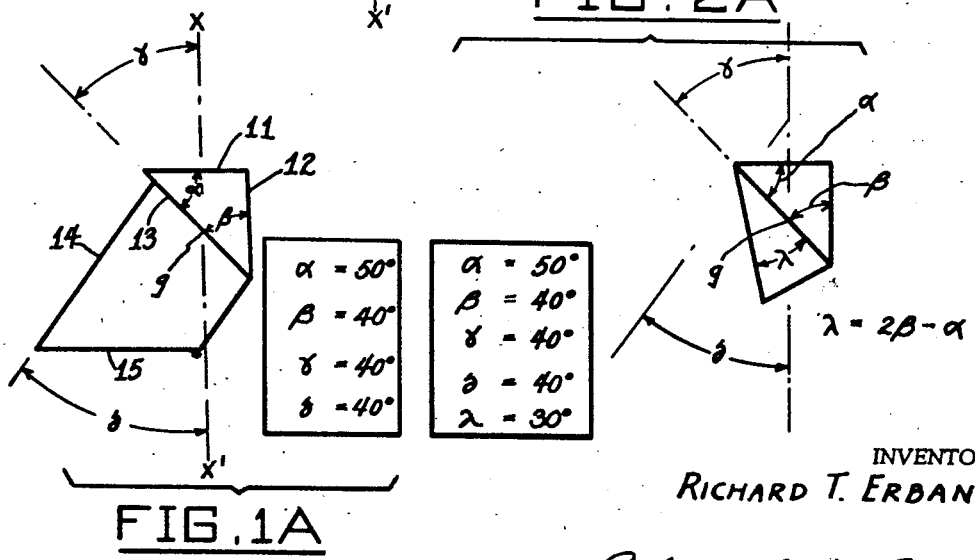
INVENTOR
RICHARD T. ERBAN
BY Richardson, David & Nordon
ATTORNEY

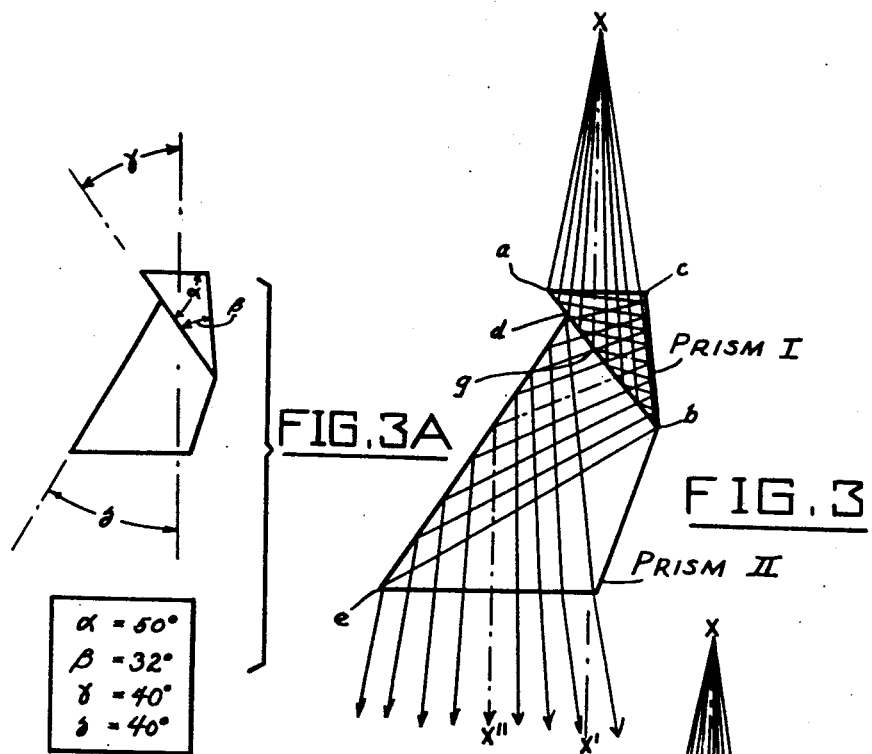
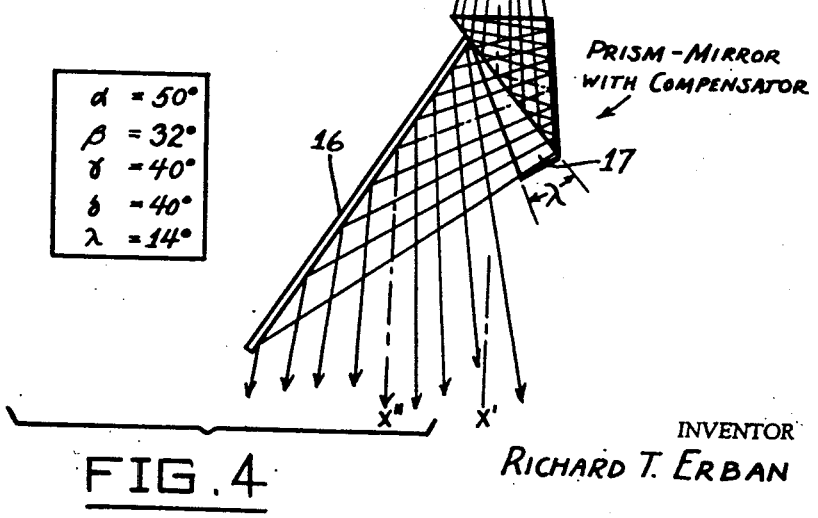

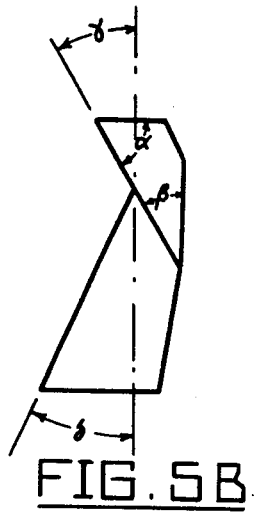
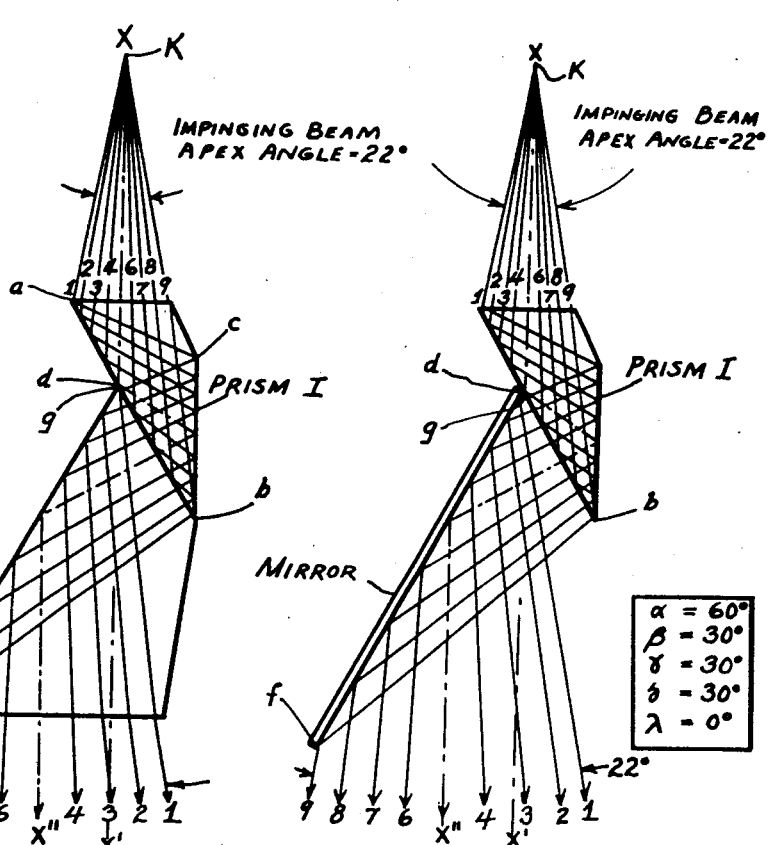
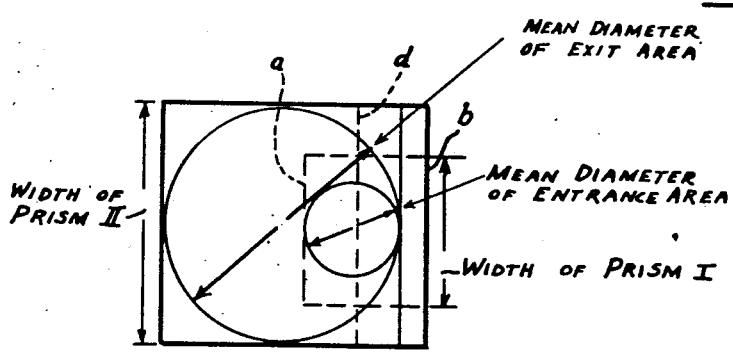

May 18, 1954  R. T. ERBAN  2,678,580
IMAGE INVERTING APPARATUS
Filed March 20, 1950  5 Sheets-Sheet 4

$\alpha = 70°$
$\beta = 35°$
$\gamma = 40°$
$\delta = 33\tfrac{1}{3}°$
$\lambda = 0°$ INVENTOR
RICHARD T. ERBAN
BY Richardson, David & Nordon
ATTORNEY

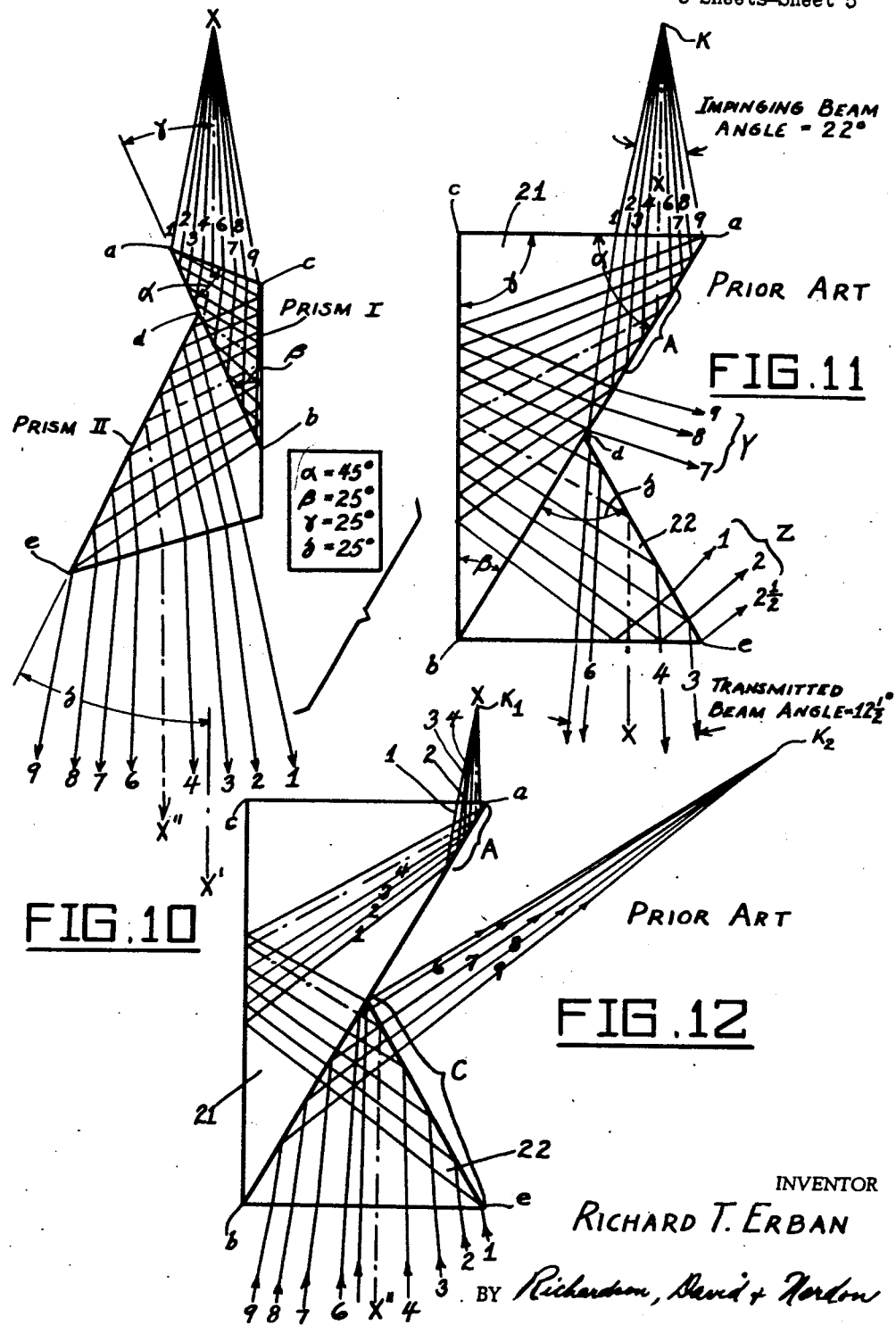

Patented May 18, 1954

2,678,580

UNITED STATES PATENT OFFICE 2,678,580

IMAGE INVERTING APPARATUS

Richard T. Erban, New York, N. Y.

Application March 20, 1950, Serial No. 150,616

5 Claims. (Cl. 88—1)

This invention relates to optical apparatus, and more particularly to optical devices for rotating a projected light beam around its optical axis.

A principal object of the invention is to provide a novel and improved optical apparatus for rotating a beam of non-parallel light rays, for example, for rotating a beam of divergent light rays around the axis of the beam, said apparatus being very simple in construction, being very compact in size, and being usable with an impinging light beam having a relatively wide angle of divergence.

A further object of the invention is to provide an improved optical device for rotating a beam of light rays, said device being usable as a beam inverter in various optical apparatus, for example, in microfilm readers of the projection type, and in similar apparatus, for providing a convenient means of rotating the image formed on the screen of the apparatus.

A still further object of the invention is to provide an improved beam inverter of small bulk and which requires less precision in manufacturing than corresponding devices of the prior art, especially with respect to the accuracy of the angles of inclination between the various reflecting surfaces of the apparatus.

The dove prism which has been used in prior art devices is objectionable because of its long length and its inability to transmit divergent rays without continuously increasing its width and length to accommodate them. This results in an objectionable addition to the height and weight of the apparatus and in a distortion of the transmitted image in the device in which it is used. The prism of this invention is designed to overcome these objections.

Further objects and advantages of the invention will become apparent from the following description and claims, and from the illustrative embodiments shown in the accompanying drawings, wherein:

Figure 1 is a diagram of a compound prism constructed in accordance with, and employing the principles of the present invention, showing the paths of the respective rays of a divergent impinging light beam through the compound prism and further illustrating the manner in which the light beam is inverted in passing through the compound prism.

Figure 1A is a diagram of the compound prism of Figure 1, accompanied by a chart showing the various angles employed in the prism elements thereof.

Figure 2 is a diagram of a compound prism and mirror system constructed in accordance with and employing the principles of the present invention and arranged to provide the same optical result as the compound prism of Figure 1.

Figure 2A is a diagram of the compound prism of Figure 2, accompanied by a chart showing the various angles employed in the prism elements thereof and showing the angle between the mirror element and the optical axis of the system.

Figure 3 is a diagram similar to Figure 1, but showing a somewhat different design of compound prism, according to the present invention.

Figure 3A is a diagram of the compound prism of Figure 3, accompanied by a chart showing the various angles employed in the prism elements thereof.

Figure 4 is a diagram similar to Figure 2, arranged to provide the same optical result as the compound prism of Figure 3 and being accompanied by a chart showing the various angles employed in the prism elements and the angle between the mirror element and the optical axis of the system.

Figure 5 is a diagram similar to Figure 1 but showing still another design of compound prism arrangement according to the present invention.

Figure 5A is a bottom view of the compound prism arrangement of Figure 5.

Figure 5B is a diagram identifying the various angles of the prism elements of the arrangement of Figure 5, and also identifying the related angles of the optical elements employed in Figure 6.

Figure 6 is a diagram of an optical system similar to Figure 2 but arranged to provide the same optical result as the system of Figure 5, the design of the system of Figure 6 being such that no compensating prism is required for the beam-receiving prism of the system.

Figure 10 is a diagram similar to Figure 1, accompanied by a chart showing the angles of the optical elements thereof, illustrating a still further modified design of an optical apparatus of the present invention.

Figure 11 is a diagram illustrating a prior art optical inverting system and illustrating the inadequacy of said prior art system to invert a divergent beam entering the system from above, the divergent impinging beam being the same as that illustrated in the preceding figures.

Figure 12 is a diagram illustrating the inadequacy of the prior art system of Figure 11 when a convergent beam having the same convergence angle as in Figure 11 enters the system from below.

Figure 8:
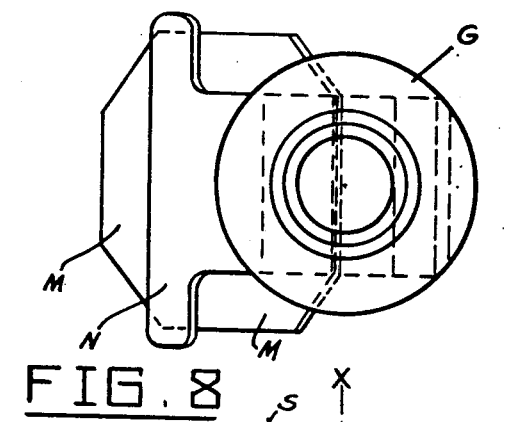
Figure 8 is a top view of the apparatus of Figure 7, with the upper supporting bearing member omitted.

The basic theoretical problem with which the present invention is concerned is to reflect a divergent light beam three times in succession within the shortest possible travel of the beam. Since the beam is constantly spreading, it requires ever increasing space for its full inclusion. If sufficient space is not provided for the full development of the beam, the central rays thereof will be filtered out or the wide-angle rays will be cut off. This latter condition occurs in prior art devices, wherein a wide angle beam, of the order of 22° divergence will not be transmitted in full but will be cut down to about 12° by the device, as will be explained further in connection with Figures 11 and 12.

A basic solution of the problem was disclosed in applicant's copending application, Serial No. 743,789, now abandoned, of which the present application is a continuation in part. The subject matter of Figures 1 and 2 of the present application is derived from the disclosure of Figures 2 and 3 of said copending application.

Referring now to the drawings, it will be seen that Figure 1 illustrates a two-prism structure for reversing a divergent light beam originating at the point X and impinging on the surface 11 defined between the corners $a$ and $c$ of the uppermost prism, designated as "Prism I." The light beam has a divergence of about 22° and the optical axis of the entrant light beam is designated at X—X'. The surface 12 of Prism I defined between the corners $c$ and $b$ is coated by silvering or equivalent means to provide internal reflection therefrom in the prism and to prevent rays from leaving the prism at said surface.

Connected to Prism I at the surface 13 defined between the corners $a$ and $b$ is a second prism, designated as "Prism II." Prism II has an inclined upper face 14 defined between its corners $d$ and $e$, and has a bottom surface 15, defined between the corners $e$ and $h$. Surface 15 is the exit surface of the unit.

Referring now to Figure 1A, it will be seen that the angle of Prism I between surface 13 and surface 11 is represented by alpha and the angle between surface 12 and surface 13 is represented by beta. The angle between surface 13 and the optical axis X—X' is represented by gamma and the angle between the surface 14 and said optical axis is represented by delta. For the typical design shown in Figure 1, the chart in Figure 1A gives the values of the various angles above defined, as follows:

Alpha=50°
Beta=40°
Gamma=40°
Delta=40°

From Figure 1 it will be further noted that surface 14 intersects surface 13 at a line designated at $d$, and that surface 13 intersects the optical axis at a point designated as $g$. It will be seen that by virtue of the disclosed arrangement, the rays of the entrant divergent beam originating at X pass through the surface 11, are internally reflected from the surface 13 to the silvered surface 12, are reflected internally from said silvered surface 13, pass through the interface between $d$ and $b$ into Prism II, are finally internally reflected from the inclined surface 14, and emerge through the exit face 15 along an axis X'' parallel to and laterally offset from the axis X—X'. The angle of divergence of the exit beam is the same as that of the entrant beam but the rays are reversed in position with respect to the axis of the beam.

Figures 2 and 2A disclose an optical unit giving the same result as the arrangement of Figures 1 and 1A but employing a mirror 16 instead of the Prism II. In addition, a compensating prism 17 is connected to the portion of the face 13 of Prism I between the lines $d$ and $b$, as shown. The compensating prism 17 does not participate in the reflection of the beam but merely prevents distortion, which would otherwise occur, because the angle alpha is smaller than twice beta. Color dispersion occurs when the central ray leaves the last prism surface at an angle different from the one formed between the entering central ray and the entrance surface. Since the entering central ray is at right angles to the surface 11, the exit central ray must form the same angle with the exit surface of the prism assembly. It does so in the arrangement of Figure 1, but it does not do so in Figure 2 without the compensating prism. The angle between the central ray (shown as a dash-dotted line) and the surface 13 in Figure 2 is 60°, or 30° from a right angle. Therefore, the compensating prism 17 must have an angle lambda of 30° to make the central ray leave at right angles.

It can be shown that the value of the angle lambda may be calculated from $$\lambda = 2\beta - \alpha$$

The chart in Figure 2A gives the values of the various angles in the system of Figure 2, as follows:

Alpha=50°
Beta=40°
Gamma=40°
Delta=40°
Lambda=30°

It will be seen that the values of the first four angles are the same as in the system of Figures 1 and 1A, and that consequently, the same optical result is obtained, as further shown by the ray diagrams of Figures 1 and 2.

Both Figures 1 and 2 show the travel of a beam of divergent rays through the apparatus. It is apparent that the first reflecting surface 13 includes a transmission surface $d$—$b$, and that light rays are reflected and transmitted on and through surface $d$—$b$ simultaneously. It is to be noted that both reflection and transmission take place with substantially 100% efficiency (except for losses of the order of 5% caused by any clear transparent surface), whereas the use of the so-called "half-silvered" or "transparent" mirror, which transmits as well as reflects, would provide a total efficiency of about 25% (50% loss in reflection, and then 50% loss in transmission, having only 25% of the original light).

It will be seen that the upper edge $d$ of the third reflecting surface (surface 14 in Figure 1 and mirror 16 in Figure 2) is located between the corner $a$ and the point $g$.

The location of the edge $d$ is chosen in accordance with the result desired in a particular case; if maximum beneficial reduction of length of the compound prism is desired, then the edge $d$ is moved closer towards the corner $a$; on the other hand, a decrease of the lateral displacement between the emerging central ray (X—X'') and the optical axis (X—X') is obtained by placing the edge $d$ nearer to point $g$.

Figures 3 and 3A disclose a two-prism system having the same angles alpha, gamma and delta as Figures 1 and 1A, but having a slightly reduced beta. The result is a somewhat longer second prism and a reduced lateral displacement of the exit central ray X'' with respect to the optical axis X—X'.

Figure 4 discloses a system having the same angles as Figures 3 and 3A but employing a mirror 16 instead of a second prism. Since, in Figure 4

$$2\beta - \alpha = 14°$$

a smaller compensating prism 17 may be employed than in Figure 2.

Figures 5, 5A, 5B and 6, show systems with angles $\alpha=60°$ and $\beta=30°$, respectively, Figures 5, 5A and 5B illustrating the two-prism system and Figure 6 illustrating the corresponding prism-mirror system. In the system of Figures 5, 5A, 5B and 6, the edge $d$ is located substantially at the point $g$. Both Figures 5 and 6 show how a bundle of divergent rays, numbered 1 to 4 and 6 to 9 are transmitted by triple reflection and leave the system in reversed order, forming an exit beam having the same angle of divergence as the entrant beam namely, approximately 22°.

Figure 5A discloses a bottom view of the arrangement of Figure 5, and shows the relative width of Prism II and that of Prism I, required to transmit a beam of about 22° divergence angle.

Since in Figure 5, edge $d$ is located substantially at point $g$, the transmission surface $d$—$b$ provides at least 50% of the first reflecting surface $a$—$b$, and reflection and transmission take place simultaneously within the area $d$—$b$. Figure 6 discloses similar conditions in a prism-mirror system employing the same basic angles as Figure 5. Since in Figure 6

$$2\beta = \alpha$$

lambda is zero, and no compensating prism is required. However, the length of surface $d$—$b$ of the mirror is always greater than the length of the surface $d$—$e$ for the prism, because of the wider beam angle in air as compared to that in glass. On the other hand, the mirror is less expensive than the Prism II, and also there is light loss due to absorption in the glass of Prism II. The light absorption in Prism I is very small, since the length of travel of the rays in Prism I is rather short as compared with Prism II.

Figure 7:
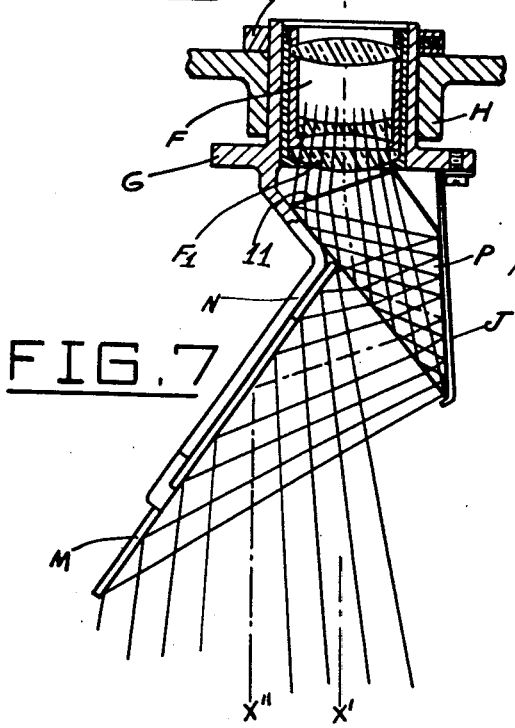
Figure 7 is a vertical cross-sectional view taken through the rotational axis of a rotatable beam inverting apparatus of the present invention, showing a typical means for mounting the optical elements and illustrating the paths of the rays of a divergent impinging beam through the apparatus.

Figure 7 discloses the combination of a projection lens system F with a prism-mirror system P—M, as employed in a microfilm reader. The lens system is supported in a rotatable member G, said member being suitably journalled for rotation around the optical axis X—X' in a stationary bearing member H and being supported by a collar S. Member G carries a bracket N for supporting the mirror M and the prism P. The prism is held in place by a bracket J. The mount G is rotatable around the optical axis X—X', which is also substantially the optical axis of the lens system F. The lowermost lens of said lens system is shown at F₁.

With respect to the lens system, the entrance surface 11 of the prism is located closely adjacent and almost touching the lowermost lens F₁, as shown.

Figure 9:
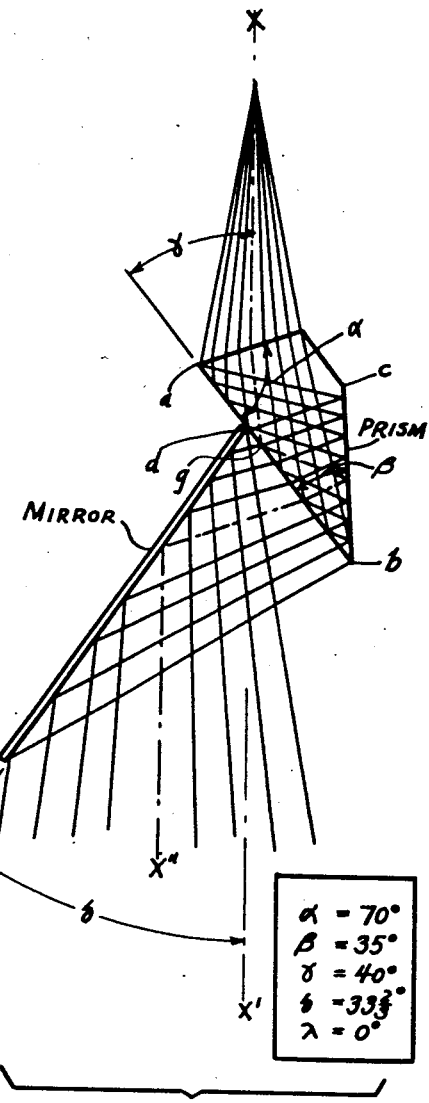
Figure 9 is a diagram similar to Figure 2 of the optical system employed in Figures 7 and 8, accompanied by a chart showing the various angles employed in the optical system.

With respect to the optical axis X—X', the center of the entrance surface 11 is located at or near said optical axis, and the angle gamma must be selected between certain limits. These limits change somewhat with the divergence angle of the beam. In general, the greater the beam angle, the smaller must be the angle gamma. For practical results, for beams of between 15° and 30° divergence, gamma must be between about 20° and 45°; beta must be between 22° and 40°, and alpha must be between 45° and 70°. Angle delta is generally between 20° and 45°, but depends on all of the other angles for its exact value. When gamma equals 90° minus alpha, and beta equals gamma, then delta equals gamma. This, however, is not the case in Figures 7 and 9. Figure 9 discloses the prism-mirror arrangement of Figure 7 with a chart giving the values of the various angles of the system.

Figure 8 is a top view of Figure 7 with the bearing member H and the bearing collar, shown in Figure 7 at S, omitted.

While Figures 7 and 9 show a prism-mirror system wherein $\alpha=70°$, Figure 10 shows a two-prism system wherein $\alpha=45°$, $\beta=25°$ and $\gamma=25°$. It is to be noted that the lateral displacement of the exit central ray X'' with respect to the optical axis X—X' is very small and is practically only one half as great as that in the other systems disclosed. Also, the system of Figure 10 comprises a very short structure. This is due to the action of the second prism in deflecting the central ray back toward the optical axis X—X'. This advantage would be lost if a mirror were employed instead of the Prism II.

A summary of the various systems disclosed herein reveals the following common features:

a. The first reflecting surface $a$—$b$ is inclined between substantially 25° and 40° (Figures 10 and 1 respectively) with respect to the optical axis.

b. The optical axis passes approximately through the center of the first reflecting surface.

c. A large portion (of the order of 50%) of the first reflecting surface serves simultaneously as a transmission surface $d$—$b$.

d. The third reflecting surface (whether in a prism or a mirror) begins with an edge located substantially between the point $g$ (intersection of the optical axis with the first reflecting surface) and the top edge $a$ of the first reflecting surface.

e. The third reflecting surface is substantially longer than the first reflecting surface, and has a length between 1.3 and 2.3 times that of the first reflecting surface.

f. The system is so placed with respect to the optical axis of the projection lens that in most cases this axis intersects the first reflecting surface substantially within the transmission area $b$—$d$. (In the two-prism system, this is the area common to both prisms.)

g. The angle beta is generally between one half alpha and one half alpha plus 10°.

It is theoretically possible to establish a formula relating the values of the various angles with the desired dimensions of the system, the refractive index of the glass used in the prisms and the lateral displacement of the central ray of the light beam.

Figure 11 discloses a prior art beam-reversing system arranged to receive a divergent beam originating at K and having an angle of divergence of about 22°. The location of the entrant beam with respect to the entrance surface c—a and the dimensions of the beam are the same as in the previous figures so that a direct comparison may be readily made between the performance of the prior art system and the system disclosed by applicant.

The prior art beam-reversing system of Figure 11 comprises a first triangular prism 21 having the entrance face a—c, the first reflecting face a—b, and the second reflecting face b—c. Connected to the lower portion of face a—b is a second triangular prism 22 having the faces b—d, d—e, and b—e arranged as shown. Face b—e is the beam exit surface of the system.

From Figure 11 it will be seen that spaced rays of the entering beam have been designated at 1 to 4, X (the central ray), and 6 to 9, corresponding to the ray numbering in Figures 5 and 6. Of the full beam, only rays 3, 4, X, 6 (and a ray slightly beyond ray 6) emerge from the bottom face b—e, giving an emergent beam angle of only about 12°. The rays 1, 2, 2½ emerge through the surface d—e in a ray bundle designated at Z, and are lost from the main ray bundle. Similarly, the rays 7, 8, 9 emerge through the surface a—b in a ray bundle designated at Y. Assuming the upper portion of surface a—b to be unsilvered, the rays 7, 8, 9 are lost. If said upper portion is silvered, the rays 7, 8, 9 will be completely scattered in the system.

Therefore, the prior art system of Figure 11 filters out or eliminates from a 22° beam a substantial portion thereof and passes only a much smaller beam, of the order of 12½°. It is to be noted that although the system is arranged so that the beam fully fills the first reflecting surface a—d, only that part of the beam which impinges within the small area designated at A is actually transmitted through the system and emerges at the bottom thereof. It is clear that moving the beam either to the right or to the left will not alter the performance materially. A slight alteration in the path of the rays will be produced, due to altered angles of incidence, so that perhaps, instead of the central part of the beam, only one or the other side of the beam is transmitted, but the total transmitted beam angle will remain restricted.

Figure 12 illustrates the performance of the prior art system of Figure 11 when a full 22° convergent beam is directed into the bottom of the system, so that the bottom surface b—e is fully "loaded." It is to be noted that the beam cross-section is exactly the same as in Figure 5. The travel of the rays in Figure 12 shows that of all the rays from 1 to 9, only a little more than the rays 1, 2, 3, 4, X, on one side of the beam, reach the apex point K₁ at the top of the system, while rays 6, 7, 8, 9 emerge on the right side after one reflection and form a parasitic apex point K₂. Thus, in a manner similar to Figure 11, only about 12½° of the 22° incident beam is correctly transmitted. Another serious defect in the performance of this system is that the distance of the apex point K₁ from the surface a—c is only about one half that of the apex point K, Figure 11, which is the apex distance employed in all of the other figures. Therefore, if one should attempt to reduce the cross-section of the beam entering at the bottom, in order to make all rays fall upon the surface C, so as to prevent scattering such as occurs with the rays 6, 7, 8, 9, then these rays will unite in an apex point inside the system even before the rays reach the reflecting area A. The same result would be obtained if it were attempted to make the entire system larger so as to accommodate all the rays 1 to 9 within the area which now receives rays 1 to 4 and X; this would require practically doubling each dimension of the prisms. It is obvious that the apex point K₁ would then lie well within the upper prism. It is thus observed that mere increase in size does not improve the performance of the prior art system. Neither will decrease in size improve such performance, as this cuts down the transmitted beam still further. It therefore follows that the prior art system of Figures 11 and 12, whatever its size, cannot successfully transmit a beam having an angle of divergence greater than about 12°.

While certain specific embodiments of optical devices for rotating a divergent light beam around its optical axis have been disclosed in the foregoing description, it will be understood that various modifications within the spirit of the invention may occur to those skilled in the art. Therefore, it is intended that no limitations be placed on the invention except as defined by the scope of the appended claims.

What I claim is:

1. In combination with an optical projection system for a divergent projection beam with an angle of divergence of at least 15°, a beam inverting prism mounted for rotation about a geometrical axis, said prism having a plurality of surfaces including: an entrant surface arranged so that said geometric axis extends substantially through its center and forms therewith an angle substantially within the range of 67° to 90°, a plane transparent reflecting surface extending from one edge of said entrant surface at an angle thereto substantially within the range of 45° to 75°, said transparent reflecting surface being positioned so as to be transected by said geometrical axis substantially near its center so that the whole divergent beam substantially fills said transparent reflecting surface and is totally reflected thereby, and a third plane prism surface being metal coated for total internal reflection, said third surface angularly facing said transparent reflecting surface at an angle within the range of 25° to 40° whereby it receives from said transparent reflecting surface the whole divergent beam and reflects the whole divergent beam back to said last mentioned surface at an angle of incidence substantially below the critical angle so that the whole divergent beam passes through said transparent reflecting surface and whereby the length of the optical path for said beam in said prism is reduced closely to the theoretical minimum length for two inversions, and a plane reflecting element positioned outside said prism and facing said transparent reflecting surface, said reflecting element having an edge adjacent said transparent reflecting surface which edge is positioned substantially between the said edge of the entrant surface and the point of intersection of the geometric axis with the said transparent reflecting surface, said plane reflecting element extending at an angle with respect to said transparent reflecting surface so as to receive the whole deviated beam passing through said transparent reflecting surface and to reflect the whole beam with substantially the same divergence as said entrant beam and with the central ray in substantially the same direction as said geometric axis.

2. In an optical system for projecting a divergent beam of light having a divergence angle of at least 15°, a beam inverting prism mounted for rotation about a geometric axis, said prism having a plane entrant surface positioned with its center substantially upon said axis and forming therewith an angle substantially within the range of 67° to 90°, a plane transparent reflecting surface positioned with its center substantially upon said geometric axis and inclined thereto at an angle substantially within the range of 25° to 40°, said transparent reflecting surface having a first edge substantially in common with the edge of said entrant surface whereby the whole divergent beam which passes through said entrant surface substantially fills said transparent reflecting surface and is totally reflected thereby, a third plane surface of said prism being metal coated for total internal reflection, said surface extending from the second edge of said transparent reflecting surface at an angle thereto substantially within the range of 25° to 40° so that it reflects the whole divergent beam back towards said transparent reflecting surface at an angle of incidence which causes the whole divergent beam to pass through said surface, and a plane reflecting element positioned outside said prism with one of its edges adjacent said transparent reflecting surface substantially between said first edge of said transparent reflecting surface and the intersection thereof with said geometric axis, said reflecting element being inclined with respect to said transparent reflecting surface at an angle substantially within the range between 50° and 80° and extending from said adjacent edge so that said reflecting element is substantially filled by the whole deviated beam passing through said transparent reflecting surface and whereby said reflecting element reflects the whole beam with substantially the same angle of divergence as said entrant beam and with the central ray substantially in the direction of said geometric axis.

3. In an optical system, in combination with a projection means for a beam having an angle of divergence of at least 15°, of a beam inverting prism mounted for rotation about a geometric axis, said prism having a plane entrant surface positioned with its center substantially upon said axis, and forming therewith an angle substantially within the range of 67° to 90°, a plane transparent reflecting surface positioned with its center substantially upon said geometric axis and inclined thereto at an angle substantially within the range of 25° to 40°, said transparent reflecting surface having a first edge substantially in common with the edge of said entrant surface whereby the whole divergent beam which passes through said entrant surface substantially fills said transparent reflecting surface and is totally reflected thereby, a third plane surface of said prism being metal coated for total internal reflection, said surface extending from the second edge of said transparent reflecting surface at an angle thereto substantially within the range of 25° to 40° so that it reflects the whole divergent beam back towards said transparent reflecting surface at an angle of incidence which is below the critical angle so that the whole divergent beam passes through said transparent reflecting surface, and a plane reflecting element positioned outside said prism with one of its edges adjacent said transparent reflecting surface substantially between said first edge of said transparent reflecting surface and the intersection thereof with said geometric axis, said reflecting element being inclined with respect to said transparent reflecting surface at an angle substantially within the range between 50° and 80° and extending from said adjacent edge so that said reflecting element is substantially filled by the whole deviated beam passing through said transparent reflecting surface, and a wedge shaped prism interposed between said transparent reflecting surface and said reflecting element, one of the surfaces of said wedge shaped prism being positioned closely adjacent to said transparent reflecting surface, so that the whole divergent beam passes through said wedge shaped prism, the angle of the wedge form being so constructed that this last named prism compensates aberrations in the beam which are caused by the said first prism.

4. In an optical system for projecting a divergent beam of light having a divergence angle of at least 15°, a beam inverting prism mounted rotatably about a geometric axis, said prism having a plane entrant surface positioned with its center substantially upon said axis, a plane transparent reflecting surface having a first edge closely adjacent to one edge of said entrant surface and being inclined with respect thereto at an angle of substantially not over 50°, said transparent reflecting surface being positioned so as to intersect said geometric axis and to extend to the other side of said intersection point so that said transparent surface is substantially filled by the whole divergent beam which passes through said entrant surface whereby the whole divergent beam is totally reflected by said transparent reflecting surface, a metal coated plane prism surface having one edge in common with said transparent reflecting surface and forming therewith an angle of substantially between 25° and 40°, said coated plane surface extending from the last named edge so that it receives the whole divergent beam from said transparent reflecting surface and reflects the whole beam back to said surface at an angle of incidence less than the critical angle whereby the whole divergent beam is transmitted through said transparent reflecting surface, and a plane reflecting element positioned outside said prism having one edge closely adjacent to that part of said transparent reflecting surface which extends from said first edge thereof to said point of intersection thereof with said geometric axis, said plane reflecting element extending from said closely adjacent edge angularly with respect to said transparent reflecting surface so that said plane reflecting element is substantially filled by the whole divergent beam and reflects said beam with substantially the same angle of divergence as the entrant beam with the central ray substantially in the direction of the geometric axis.

5. In an optical apparatus for projecting and inverting a divergent beam of light having an angle of divergence of at least 15°, a prism mounted for rotation about a geometric axis, said prism having a plane entrant surface positioned with its center substantially upon said geometric axis and inclined with respect thereto at an angle of substantially 70°, a plane transparent reflecting surface having one edge in common with said entrant surface and having its center positioned substantially upon said geometric axis, said transparent reflecting surface extending from said edge at an angle of inclination of substantially 70° with respect to said entrant surface so that the whole divergent beam substantially fills said transparent reflecting surface and that the whole beam is totally reflected from said surface, a third plane surface of said prism being metal coated for total internal reflection and having one edge in common with said transparent reflecting surface and forming therewith an angle of substantially 35° so that it receives the whole divergent beam reflected towards it by said transparent reflecting surface and reflects the whole beam back to said last named surface at an angle of incidence less than the critical angle whereby the whole divergent beam passes through said transparent reflecting surface, and a plane reflecting surface outside said prism positioned with one of its edges virtually in contact with said transparent reflecting surface at a location substantially between its first said common edge with the entrant surface and the point of intersection of the geometric axis with the transparent reflecting surface, said plane reflecting surface forming an angle of substantially 73° to 75° with the said transparent reflecting surface.

References Cited in the file of this patent

UNITED STATES PATENTS

| Number | Name | Date |
|---|---|---|
| 840,378 | Salon | Jan. 1, 1907 |
| 986,642 | Moller | Mar. 14, 1911 |
| 1,497,356 | Comstock | June 10, 1924 |
| 1,561,173 | Koster | Nov. 10, 1925 |
| 1,965,688 | Chase | July 10, 1934 |
| 2,317,988 | Forssberg | May 4, 1943 |
| 2,352,914 | Rackett | July 4, 1944 |

FOREIGN PATENTS

| Number | Country | Date |
|---|---|---|
| 669,001 | France | July 27, 1929 |
| 734,309 | France | July 26, 1932 |
| 701,189 | Germany | Jan. 10, 1941 |
| 892,413 | France | Jan. 7, 1944 |